(12) United States Patent
Alameh et al.

(10) Patent No.: US 9,002,416 B2
(45) Date of Patent: Apr. 7, 2015

(54) WIRELESS COMMUNICATION DEVICE RESPONSIVE TO ORIENTATION AND MOVEMENT

(75) Inventors: Rachid M. Alameh, Crystal Lake, IL (US); Roger W. Ady, Chicago, IL (US); William S. Hede, Lake in the Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 545 days.

(21) Appl. No.: 12/341,633

(22) Filed: Dec. 22, 2008

(65) Prior Publication Data
US 2010/0160004 A1     Jun. 24, 2010

(51) Int. Cl.
| | | |
|---|---|---|
| H04M 1/00 | (2006.01) | |
| G08B 29/00 | (2006.01) | |
| H04M 1/725 | (2006.01) | |
| G06F 1/16 | (2006.01) | |
| G06F 1/32 | (2006.01) | |

(52) U.S. Cl.
CPC ......... *H04M 1/72522* (2013.01); *G06F 1/1626* (2013.01); *G06F 1/1694* (2013.01); *G06F 1/1698* (2013.01); *G06F 1/3203* (2013.01); *G06F 2200/1637* (2013.01); *H04M 2250/12* (2013.01)

(58) Field of Classification Search
CPC .... G06F 1/1626; G06F 1/1694; G06F 1/1698
USPC .................. 455/575.1, 556.1, 550.1; 340/5.61
See application file for complete search history.

(56) References Cited

U.S. PATENT DOCUMENTS

| | | |
|---|---|---|
| 5,656,804 A | 8/1997 | Barkan et al. |
| 6,424,843 B1 | 7/2002 | Reitmaa et al. |
| 7,036,091 B1 | 4/2006 | Nguyen |

(Continued)

FOREIGN PATENT DOCUMENTS

| | | |
|---|---|---|
| CN | 1474963 A | 2/2004 |
| CN | 101042848 A | 9/2007 |

(Continued)

OTHER PUBLICATIONS

Cho, Nam Shin: "The International Search Report and the Written Opinion of the International Searching Authority", Korean Intellectual Property Office, Daejeon, Republic of Korea, completed: Jun. 28, 2010, mailed: Jun. 28, 2010, all pages.

(Continued)

*Primary Examiner* — Qun Shen
(74) *Attorney, Agent, or Firm* — Shumaker & Sieffert, P.A.

(57) ABSTRACT

A wireless communication device responsive to orientation and movement comprising a housing, a cellular transceiver capable of communicating with a cellular communication network, a WLAN transceiver capable of communicating with a remote device via an ad hoc network, a sensor and a processor. The sensor detects a substantially vertical orientation of the wireless communication device. The sensor also detects a movement of the wireless communication device subsequent to detecting the substantially vertical orientation of the wireless communication device. The processor performs a function of the wireless communication device in coordination with the remove device via the WLAN transceiver. The processor performs this function in response to detecting the substantially vertical orientation and the movement of the wireless communication device.

14 Claims, 3 Drawing Sheets

(56) References Cited

U.S. PATENT DOCUMENTS

| | | | |
|---|---|---|---|
| 7,138,904 B1* | 11/2006 | Dutu | 340/5.72 |
| 7,194,816 B2 | 3/2007 | Tamura | |
| 7,280,096 B2* | 10/2007 | Marvit et al. | 345/156 |
| 7,289,102 B2 | 10/2007 | Hinckley et al. | |
| 7,352,567 B2* | 4/2008 | Hotelling et al. | 361/679.55 |
| 8,295,879 B2 | 10/2012 | Alameh et al. | |
| 2002/0158812 A1* | 10/2002 | Pallakoff | 345/5 |
| 2003/0085870 A1 | 5/2003 | Hinckley | |
| 2004/0077381 A1 | 4/2004 | Engstrom | |
| 2004/0212617 A1 | 10/2004 | Fitzmaurice et al. | |
| 2004/0214594 A1 | 10/2004 | Holman, IV | |
| 2004/0259591 A1 | 12/2004 | Grams et al. | |
| 2005/0001815 A1* | 1/2005 | Tsunoda | 345/158 |
| 2005/0046699 A1* | 3/2005 | Oya et al. | 348/207.1 |
| 2005/0212749 A1* | 9/2005 | Marvit et al. | 345/156 |
| 2006/0062382 A1* | 3/2006 | Ronkainen | 379/433.06 |
| 2006/0149436 A1 | 7/2006 | Bertosa et al. | |
| 2006/0240872 A1 | 10/2006 | Yuan et al. | |
| 2007/0004451 A1* | 1/2007 | C. Anderson | 455/556.1 |
| 2007/0035917 A1 | 2/2007 | Hotelling et al. | |
| 2007/0124677 A1 | 5/2007 | de los Reyes et al. | |
| 2007/0172953 A1 | 7/2007 | Shim | |
| 2007/0211573 A1 | 9/2007 | Hermansson | |
| 2007/0224938 A1 | 9/2007 | Jung et al. | |
| 2007/0259685 A1 | 11/2007 | Engblom et al. | |
| 2007/0271528 A1 | 11/2007 | Park et al. | |
| 2007/0275755 A1 | 11/2007 | Chae et al. | |
| 2007/0291112 A1 | 12/2007 | Harris | |
| 2007/0298751 A1 | 12/2007 | Wulff | |
| 2008/0020733 A1* | 1/2008 | Wassingbo | 455/411 |
| 2008/0152263 A1 | 6/2008 | Harrison | |
| 2008/0195735 A1 | 8/2008 | Hodges et al. | |
| 2008/0244454 A1 | 10/2008 | Shibaike | |
| 2008/0259094 A1* | 10/2008 | Kim et al. | 345/651 |
| 2008/0280642 A1* | 11/2008 | Coxhill et al. | 455/556.1 |
| 2009/0013254 A1 | 1/2009 | Walker et al. | |
| 2009/0098907 A1 | 4/2009 | Huntzicker et al. | |
| 2009/0160643 A1* | 6/2009 | Lizza | 340/540 |
| 2010/0090971 A1 | 4/2010 | Choi et al. | |
| 2010/0281374 A1 | 11/2010 | Schulz et al. | |
| 2011/0119589 A1 | 5/2011 | Alameh et al. | |

FOREIGN PATENT DOCUMENTS

| | | | | |
|---|---|---|---|---|
| DE | 102006010493 A1 | 9/2007 | | |
| EP | 0 825 514 A2 | 2/1998 | | |
| EP | 1 385 082 A1 | 1/2004 | | |
| EP | 1 222 518 B1 | 5/2004 | | |
| EP | 1 818 766 A1 | 8/2007 | | |
| EP | 1 837 736 A2 | 9/2007 | | |
| KR | 10-2008-0093808 A | 10/2008 | | |
| WO | 02/23291 A2 | 3/2002 | | |
| WO | 2005027363 A1 | 3/2005 | | |
| WO | 2007149731 A1 | 12/2007 | | |
| WO | WO-2007/149731 | * | 12/2007 | H04M 1/725 |
| WO | 2010056548 A1 | 5/2010 | | |

OTHER PUBLICATIONS

Benjamin Poppinga and Thomas Schlomer, Nintendo Co., Ltd. "Wiigee", 2008, University of Oldenburg, Germany.
Mark Hachman, Gearlog , GPS Shocker: Garmin Enters the Cell Phone Market, Jan. 31, 2008.
Andrew Crossan, Roderick Murray-Smith, Variability in Wrist-Tilt Accelerometer Based Gesture Interfaces, pp. 1-12.
U.S. Appl. No. 12/129,903, to Rachid M. Alameh, et al., filed May 30, 2008, titled Devices and Methods for Initiating Functions Based on Movement Characteristics Relative to a Reference.
EPC Extended Search Report for European Patent Application No. 09835482 dated Apr. 16, 2012, 8 pages.
Simonite, "Synchronised Shaking Connects Gadgets Securely" Newscientist, Nov. 13, 2007, pp. 1-2.
Korean Intellectual Property Office, Non-Final Office Action for Korean Patent Application No. 10-2011-7014283 dated Sep. 10, 2012, 3 pages.
The State Intellectual Property Office of the People's Republic of China, "Notification of the First Office Action" for Chinese Application No. 200980151887.1 dated May 14, 2013, 14 pages.
Korean Intellectual Property Office, Non-Final Office Action for Korean Patent Application No. 10-2011-7014283 dated May 27, 2013, 3 pages.
European Patent Office, "Extended Search Report" for European Patent Application No. 13197019.6 dated Feb. 26, 2014, 9 pages.
Notification of the Second Office Action for Chinese Application No. 200980151887.1 dated Jan. 14, 2014, 12 pp.
Notification of the Third Office Action for Chinese Application No. 200980151887.1 dated May 9, 2014, 13 pp.
International Search Report and Written Opinion from International Application No. PCT/US2009/066504, dated Jun. 28, 2010, 11 pp.
International Preliminary Report on Patentability from International Application No. PCT/US2009/066504, dated Jun. 29, 2011, 4 pp.
Response to European Patent Application No. 09835482.2, to Office Action dated May 3, 2012, filed Nov. 13, 2012, 7 pp.
Response to European Patent Application No. 09835482.2, to Office Action dated Jun. 14, 2013, filed Dec. 11, 2013, 6 pp.
Response to Korean Patent Application No. 10-2011-7014283, to Office Action, filed Nov. 1, 2012, 19 pp.
Response to communication for European Application No. 13197019.6, filed Sep. 25, 2014, 23 pp.
El-Shimy et al., "Eyes-free environmental awareness for navigation" Journal on Multimodal User Interfaces, Nov. 22, 2011, 11 pp.
GPX MW-3815 (256 MB) MP3 Player; www.epinions.com/GPX__MW__3815__256__MB__MPL__Player/content__224032820868 Nov. 7, 2008, 6 pp.
Motorola, Inc.: "PageWriter 2000X User's Guide", 1999, Boynton Beach, FL., pp. 6-7.
The GPX MW3815 MP3 Player; www.Epinions.com; Nov. 7, 2008; 6 pp.
IPT Decision from Korean Application No. 10-2011-7014283, issued Oct. 23, 2014 19 pp.
Notice of Preliminary Rejection from Korean Application No. 10-2014-7006968, mailed Dec. 30, 2014 11 pp.

* cited by examiner

WIRELESS COMMUNICATION DEVICE RESPONSIVE TO ORIENTATION AND MOVEMENT

FIELD OF THE INVENTION

The present invention relates generally to the field of portable electronic devices having wireless communication capabilities. More particularly, the present invention relates to a wireless communication device capable of performing a function in response to conditions detected by one or more of its sensors.

BACKGROUND OF THE INVENTION

Wireless communication devices, and in particular cellular-based telephones, may incorporate many different modes, applications and functions. For example, a wireless communication device may not only include wireless communication capabilities, but may include other capabilities as well, such as media playback, image and video capture, audio and video streaming and broadcast, video conferencing, messaging, Internet browsing, e-commerce capabilities, and the like. Wireless Local Area Network ("WLAN")-enabled wireless communication devices may utilize an ad hoc communication protocol to communication with a remote device, such as a computer, so that files of the wireless communication device may be synchronized with files of the remote device. Wireless communication devices are evolving into powerful tools for information management.

Users of wireless communication devices most often utilize menus provided on their device's display screens to activate or initiate various electronic functions, such as modes, applications and functions, of their device. In doing so, a user directs their attention to the display screen, and possibly navigates through several different menus to activate or initiate the desired mode, application or function of their device. In utilizing menus, or even a simply soft key press, the activation or initiation of a different mode, application or function may not be inconspicuous, private or convenient.

Sensors are becoming an integral part of wireless communication device technology for improving user interface and device interaction. Devices may be embedded with various types of sensors to achieve additional functionalities. Sensors of a device may determine particular conditions and, based on a sensed condition, the device may then activate and/or initiate a certain function. However, such a device is not adaptable in real-time to process arbitrary conditions to provide a user options for initiating or activating functions of the device.

DETAILED DESCRIPTION OF THE EMBODIMENTS

A wireless communication device in accordance with the present invention includes components that provide a simple, intuitive method for performance a function of the device. For these components and method, the wireless communication device performs the function of the device based on a predetermined orientation and movement following the predetermined orientation. If the wireless communication device is positioned by the user at a substantially vertical orientation, then the device will detect this vertical orientation and monitor the immediately subsequent movement of the device. If a predetermined movement by the user is detected following the detection of the vertical orientation, then the wireless communication device will determine that this unique combination of orientation and movement is intended by the user to trigger are particular function associated with this combination. When the wireless communication device detects this unique combination of orientation and movement, it is likely that the user intended the performance of the particular function because it is not likely that this combination would be detected under normal usage and transport of the device.

Figure 1:
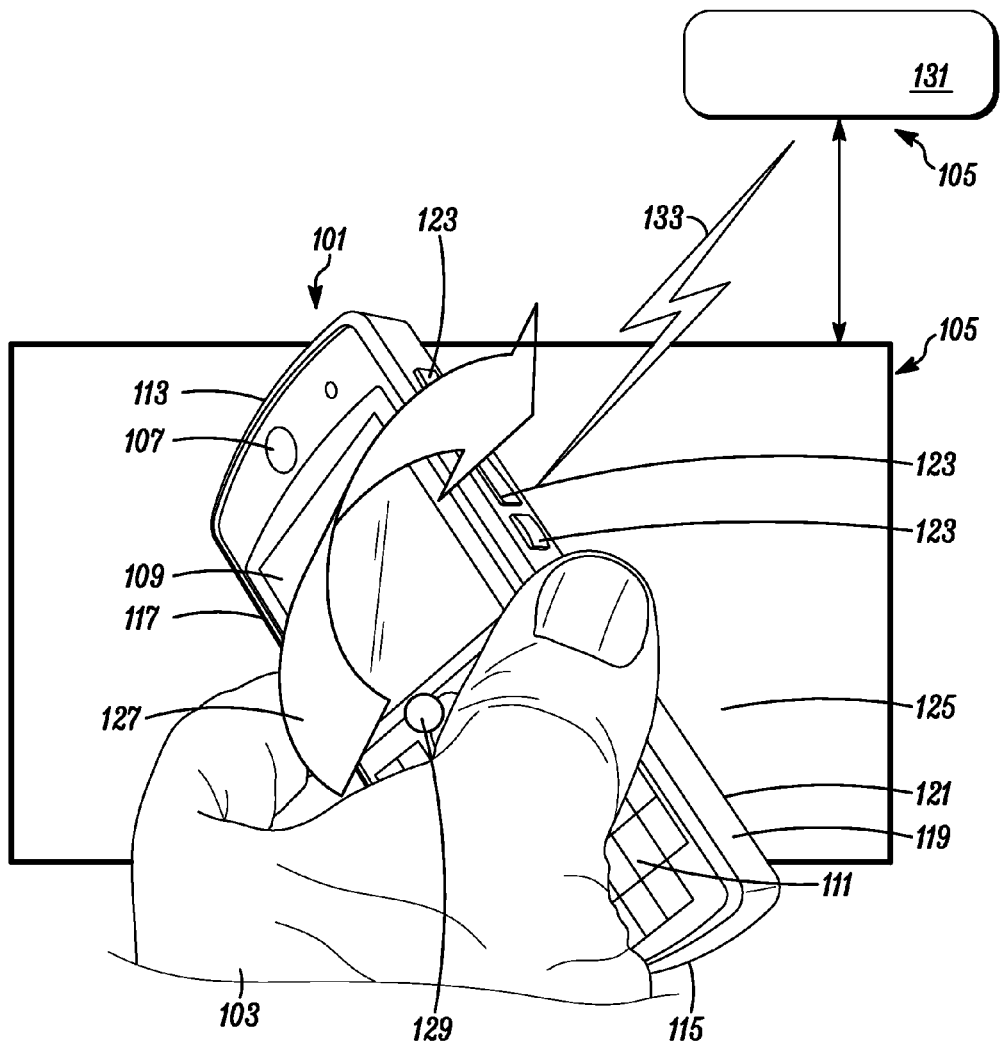
FIG. 1 is a perspective view of an embodiment in accordance with the present invention.

Referring to FIG. 1, there is illustrated a perspective view of an embodiment in accordance with the present invention. The embodiment may be any type of wireless communication device 101 having the capability of detecting the orientation and movement of the device, and perform a function of the wireless communication device in response to detecting the orientation and movement. Examples of the wireless communication device 101 include, but are not limited to, cellular-based mobile phones, WLAN-based mobile phones, notebook or laptop computing devices, personal digital assistants, personal navigation device, touch screen input device, pen-based input devices, and the like. The wireless communication device 101 may be portable for transport by a user. For example, as shown in FIG. 1, the wireless communication device 101 may be held by a single hand 103 of the user.

To facilitate usage of the wireless communication device 101 in accordance with the present invention, the device may be used in conjunction with a vertical plane 105 as shown in FIG. 1. It is to be understood that the vertical plane 105 is any plane that is substantially vertical, i.e., more vertical in orientation than horizontal. In other words, the vertical plane 105 may vary by 45 degrees in either direction (for a full range of 90 degrees) from an absolute vertical orientation relative to the ground. For example, the wireless communication device 101 may be used in conjunction with a vertical plane 105 that is positioned 70 degrees from horizontal (i.e., 20 degrees from absolute vertical) in accordance with the present invention.

By positioning the wireless communication device 101 adjacent to the vertical plane 105, the user hand 103 may easily position the device in a vertical orientation and rotate or slide the device against the surface. For one embodiment, the wireless communication device 101 have a housing comprising a front surface 107 which includes a visible display 109 and a plurality of input keys 111. When utilizing this embodiment in accordance with the present invention, the front surface 107 including the display 109 and keys 111 is directed towards the user's hand 103 and opposite the vertical plane 105. For another embodiment, the wireless communication device 101 may comprise a front surface 107 which includes a touch screen display. It is to be understood that the wireless communication device 101 may include a variety of different combination of displays and interfaces at its front surface 107.

In addition to the front surface 107, the housing of the wireless communication device 101 may also include a top surface 113, a bottom surface 115, a left surface 117, a right surface 119, and a back surface 121. The various surfaces of the wireless communication device 101 do not necessarily need to be flat, but the configuration of the device should facilitate orientation and rotation of the device. For example, one embodiment as shown in FIG. 1, the largest surface, i.e., the front surface 107 and the back surface 121, of the wireless communication device 101 are directed toward the user's hand 103 and the vertical plane 105, respectively. Also, for the embodiment, the display 109 and user interface, i.e., input keys 111, are located on the surface directed towards the user's hand 103 and away from the vertical plane 105, so that the display and user interface are not subjected to pressure exerted by the user's hand 103 as the device is placed against the vertical plane.

The top surface 113, the bottom surface 115, the left surface 117, the right surface 119 of the housing of the wireless communication device 101 are not required to have any particular shape or configuration relative to the front and back surfaces 107 and 121, but the wireless communication device is positioned at a horizontal orientation when the wireless communication device rests on a horizontal surface. For example, for the embodiment shown in FIG. 1, each of the top, bottom, left, and right surfaces 113, 115, 117, 119 of the housing of the wireless communication device 101 have surface areas that are less than the surface area of each of the front and back surfaces 107, 121. Thus, for this example, the wireless communication device may rest on a horizontal surface, such as a table or desk, on its front surface 107 or its back surface 121, but it is not likely to rest on its top, bottom, left or right surfaces 113, 115, 117, 119 due to their smaller surface areas.

Similar to the front surface 107, the top surface 113, the bottom surface 115, the left surface 117, and the right surface 119 of the housing may include one or more user interfaces. For example, as shown in FIG. 1, the right surface 115 includes input keys 123 for controlling certain functions of the wireless communication device 101.

The vertical plane 105 includes a vertical surface 125 to receive the back surface 121 of the housing when the wireless communication device 101 is adjacent to the vertical plane. A user may support the wireless communication device 101 against the vertical plane 105 by exerting a force against the front surface 107 of the device substantially perpendicular to the vertical plane. In this manner, the vertical surface 125 of the vertical plane 105 exerts a counterforce against the back surface 121 of the device 101 support the device between the user hand 103 and the vertical plane. Although the user may be able to maintain the wireless communication device 101 in a vertical orientation without using the vertical flat plan 105, the vertical plane facilitates the user's ability to orient the device at a vertical orientation because the user may simply hold the device flush against the vertical plane to find the correct vertical orientation. The vertical plane 105 also facilitates the user's ability to maintain the wireless communication device 101 steadily at this vertical orientation, because the device will be as steady as the vertical plane by resting against it.

After maintaining the wireless communication device 101 steady against the vertical plane 105, the device monitors its immediately subsequent movement 127 to determine whether a predetermined movement may be identified. For example, as illustrated by the embodiment of FIG. 1, if the wireless communication device 101 rotates about a center 129 of the device, then this movement may trigger a particular function of the device. For another embodiment, a linear movement where two or more portions of the wireless communication device 101 move in parallel may trigger the same, or a different, function of the device. The linear movement may be unidirectional or bidirectional, i.e., back and forth movement. For another embodiment, the wireless communication device 101 may be able to recognize more than one movement and, thereby, associate different movements with different functions.

The vertical plane 105 may be any type of substantially flat surface that may be used to facilitate the orientation and movement of the wireless communication device 101. For one embodiment, the vertical plane 105 may be a monitor or display having a vertical surface 125 to receive and support the back surface 121 of the housing of the wireless communication device 101. The display may include, or be coupled to, an electronic circuit or device 131 to control the image provided by the display. A wide variety of images may be shown by the display that may be associated with the wireless communication device 101 and/or one or more applications that may be executed by the device. For example, the display may provide directions for wirelessly coupling the wireless communication device 101 and the electronic circuit or device 131. As another example, the display may provide directions for placement of the device 101 against the vertical surface 125 and for movement of the device after placement against the vertical surface. As yet another example, the display may provide information about different movements of the wireless communication device triggers different functions.

For another embodiment, the vertical plane 105 may include multiple nested slots on a computer component, such as a computer display, in which each slot may be located at a different elevation relative to a base of the computer component. Placement of the wireless communication device 101 in a particular slot at a certain elevation may trigger a function different from a function triggered by a different slot at a different elevation of the computer component. For example, placement of the wireless communication device 101 at a first slot may trigger a synchronization function between the device and a device associated with the computer component, whereas placement of the device in a second slot different from the first slot may trigger a function to transfer certain files between these devices. For another example, placement of the wireless communication device 101 at a particular elevation may activate charging of the power source of the device using one type of charging technology or speed, whereas placement of the device at a different elevation may activate charging of the power source using a different type of charging technology or different speed. Functions may be triggered or activated based on placement at a stationary elevation or by as supplemental motion, such as a rotational, sliding or gesturing motion, while the wireless communication device 101 is maintained at the particular elevation.

For yet another embodiment, the vertical plane 105 may be an external portion of a vehicle, such as a window or door of an automobile. For example, the back surface 101 of the housing of the wireless communication device 101 may be placed adjacent to a side window of an automobile. For this example, after holding the wireless communication device 101 steady at a substantially vertical orientation, the phone may be rotated 127 clockwise about the center 129 may lock the corresponding door lock and a counter-clockwise rotation may unlock the corresponding door lock. It should be noted that the vertical plane may be substantially flat instead of absolute flat. For example, some automobile window have a non-flat that is somewhat curved, so the back surface 121 of the wireless communication device 101 may tilt depending on where the user presses against it, e.g., top-to-bottom and side-to-side. That movement against a non-flat surface offers another activation gesture: Instead of rotation, a user can slide handset down the window to lock and up to open.

The wireless communication device 101 includes at least one wireless transceiver, i.e., WLAN transceiver, to communication with a nearby device via an ad hoc network protocol, such as HomeRF, Bluetooth, IEEE 802.11 (a, b, g or n), and infrared. The electronic circuit or device 131 integrated in, or coupled to, the vertical plane 105 may also include a wireless transceiver to communicate with the wireless transceiver of the wireless communication device 101 via a wireless link 133. Accordingly, the wireless communication device 101 may perform a function that includes coordinating the function with a remote device via the wireless link 133. For example, the wireless communication device 101 may copy, move or otherwise synchronize one or more files with the electronic circuit or device 131 via the wireless link 133, in response to detecting a vertical orientation of the device and detecting a movement of the device subsequent to detecting the vertical orientation.

Figure 2:
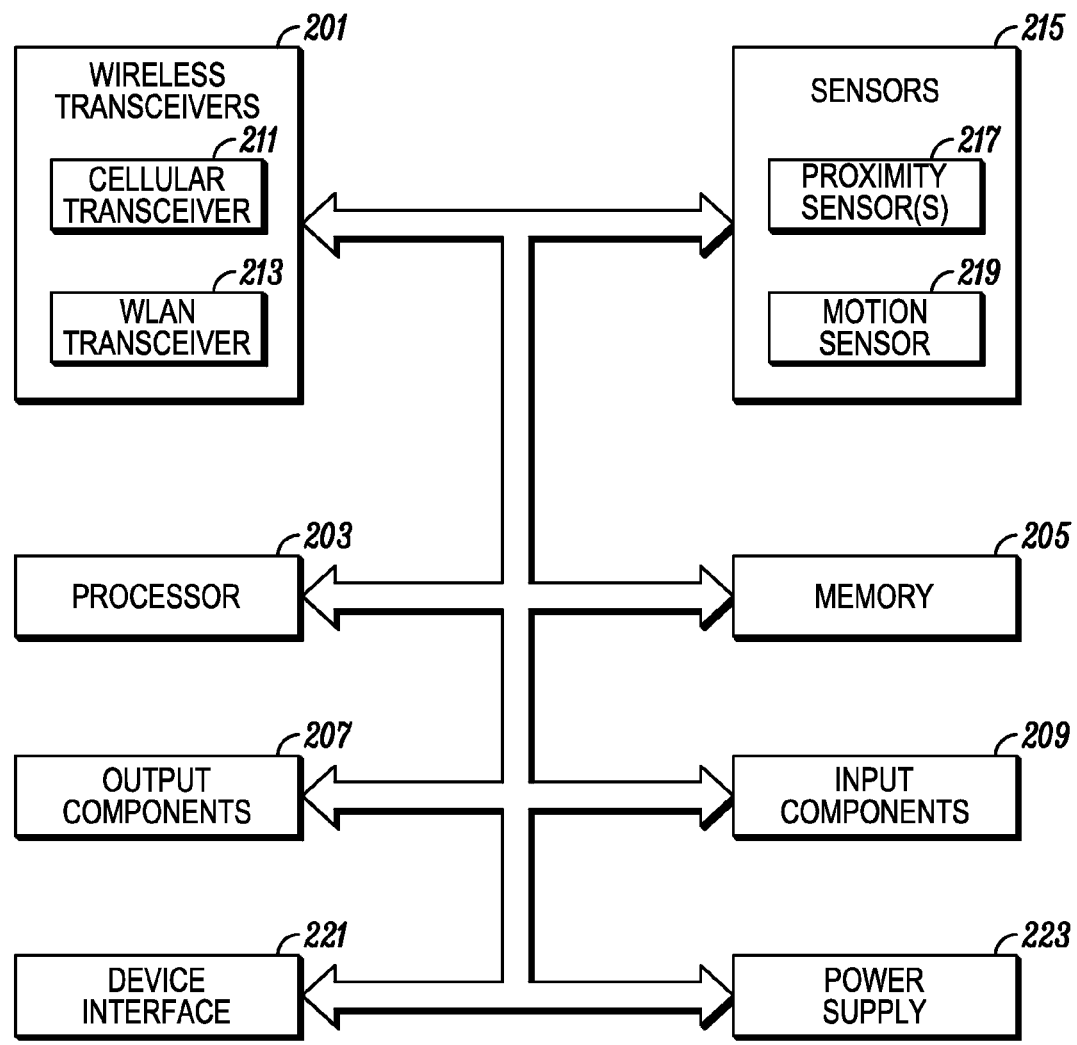
FIG. 2 is a block diagram of example components of an embodiment in accordance with the present invention.

Referring to FIG. 2, there is provided a block diagram illustrating example internal components 200 of the wireless communication device in accordance with the present invention. The example embodiment includes one or more wireless transceivers 201, a processor 203, a memory 205, one or more output components 207, and one or more input components 209. Each embodiment may include a user interface that comprises one or more output components 207 and one or more input components 209. Each wireless transceiver 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE or IEEE 802.16) and their variants, as represented by cellular transceiver 211. Each wireless transceiver 201 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology, as represented by WLAN transceiver 213. The wireless transceiver 201 may also be a simple ASK (amplitude shift keying) TX/RX circuitry commonly used for key FOB's. Also, each transceiver 201 may be a receiver, a transmitter or both.

The processor 203 may generate commands based on information received from one or more input components 209 and one or more sensors 215. The processor 203 may process the received information alone or in combination with other data, such as the information stored in the memory 205. Thus, the memory 205 of the internal components 200 may be used by the processor 203 to store and retrieve data. The data that may be stored by the memory 205 include, but is not limited to, operating systems, applications, and data. Each operating system includes executable code that controls basic functions of the wireless communication device, such as interaction among the components of the internal components 200, communication with external devices via each transceiver 201 and/or the device interface (see below), and storage and retrieval of applications and data to and from the memory 205. Each application includes executable code utilizes an operating system to provide more specific functionality for the wireless communication device. Data is non-executable code or information that may be referenced and/or manipulated by an operating system or application for performing functions of the wireless communication device. For example, the processor 203 may retrieve information about user preference to calibrate the sensitivity of the sensors 215 from the memory 205.

The input components 209 of the internal components 200 may include a video input component such as an optical sensor (for example, a camera), an audio input component such as a microphone, and a mechanical input component such as button or key selection sensors, touch pad sensor, touch screen sensor, capacitive sensor, motion sensor, and switch. Likewise, the output components 207 of the internal components 200 may include a variety of video, audio and/or mechanical outputs. For example, the output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

The sensors 215 are similar to the input components 209, but are particularly identified separately in FIG. 2 due to their importance for the present invention. The wireless communication device 100, in accordance with the present invention, may includes at least one sensor 215, such as a tilt sensor, to detect a vertical orientation of the wireless communication device and detecting a movement of the wireless communication device subsequent to detecting the vertical orientation of the wireless communication device. For example, as illustrated by FIG. 2, the sensors 215 may include an orientation sensor and a motion sensor 219. Examples of these sensors 215 include, but are not limited to, accelerometers, touch sensors, surface/housing capacitive sensors, video sensors (such as a camera), infrared proximity sensors 217, and/or a compass sensor. An accelerometer may be embedded in the electronic circuitry of the wireless communication device 101 to show vertical orientation, constant tilt and/or whether the device is stationary. Touch sensors may used to indicate whether the device is being touched at the right and/or left surfaces 117, 119, thus indicating whether or not certain orientations or movements are intentional by the user. Surface/housing capacitive sensors may be used to indicate inactivity or adjacent positioning against the vertical plane 105. As an alternate to the capacitive sensors, a camera or infrared proximity sensor 217 may be used to determine whether the device is positioned adjacent to, or against, the vertical plane 105. IR reflection detection of a "signature" of the vertical plane 105, such as a reflection off of a special, security sticker or coating placed on a surface of the vertical plane. A compass sensor may be used as an orientation sensor, in which an accelerometer may be used to detect tile relative to gravity.

For still another embodiment, a portable electronic device may be used to control a portal locking mechanism of a nearby vehicle, i.e., lock and/or unlock a door of an automobile. The device may detect a substantially vertical orientation of the device, and detect a movement of the device subsequent to detecting a substantially vertical orientation of the device. For example, the device may be positioned substantially vertical against a convex surface of glass window of an automobile door and turned clockwise or counter-clockwise, similar to the motion of turning a key in a door lock. As the device is moved while against the portal, a scanning component (such as an infrared sensor) may scan a surface of the portal for a coded image. For example, a coded sticker may be placed on an inside surface of the automobile door so that it is visible externally from the vehicle. Thereafter, the device may change a locked status of the portal locking mechanism in response to identifying the coded image. For example, the device may transmit a signal to an electronic circuit of the vehicle to unlock or lock the portal upon confirming the identity of the coded image.

In addition, the embodiments of the present invention may also utilizes other sensors in conjunction with these sensors 215, such as a sensor for a global positioning system ("GPS"). For example, after orientation and movement are detected, the wireless communication device 101 may record or otherwise store the GPS location of the device in response to detecting a substantially vertical orientation and a movement of the device. The wireless communication device 101 may record the GPS location automatically, inconspicuous to the user, and may be activated by another sensor, such as the detection of a certain orientation, motion or rotational action. At a subsequent time, the wireless communication device 101 may use that GPS location information return to the location previously recorded. As another measure of security, the wireless communication device 101 may compare the current GPS location with a previously recorded GPS location. If the GPS locations match, then the wireless communication device 101 may perform the device function.

The internal components 200 may further include a device interface 221 to provide a direct connection to auxiliary components or accessories for additional or enhanced functionality. In addition, the internal components 200 preferably include a power source 223, such as a portable battery, for providing power to the other internal components and allow portability of the wireless communication device 101.

It is to be understood that FIG. 2 is provided for illustrative purposes only and for illustrating components of a wireless communication device in accordance with the present invention, and is not intended to be a complete schematic diagram of the various components required for a wireless communication device. Therefore, a wireless communication device may include various other components not shown in FIG. 2, or may include a combination of two or more components or a division of a particular component into two or more separate components, and still be within the scope of the present invention.

Figure 3:
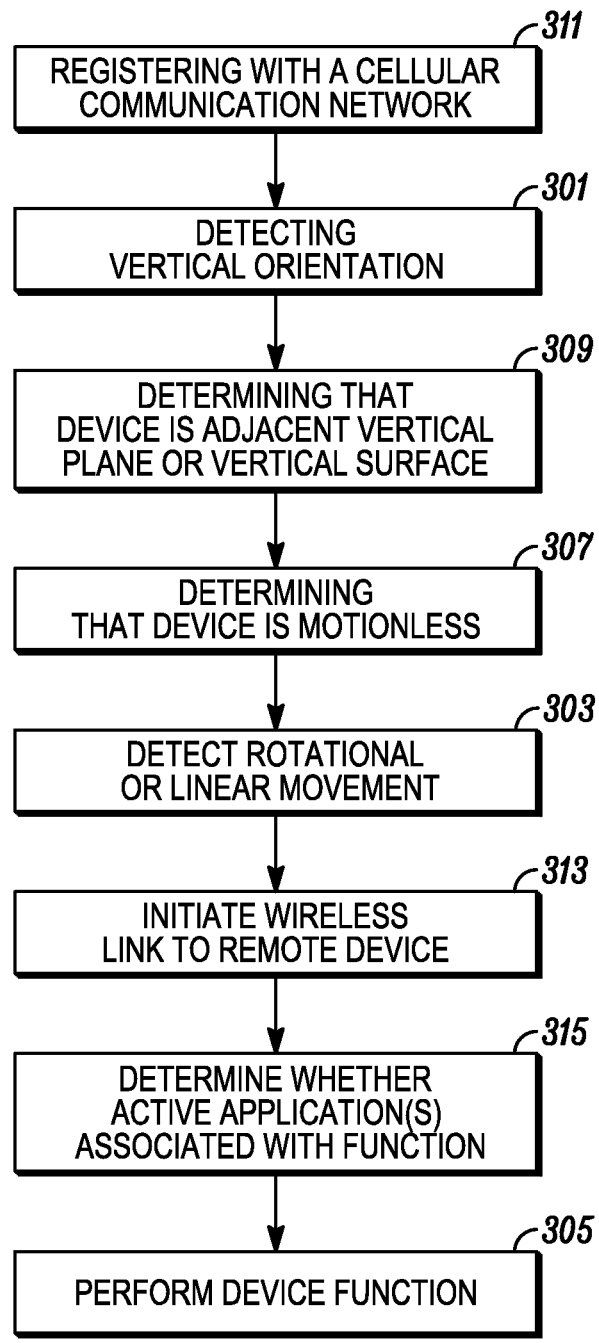
FIG. 3 is a flow diagram illustrating an operation of an embodiment in accordance with the present invention.

Referring to FIG. 3, there is represented a flow diagram illustrating an operation 300 of an embodiment in accordance with the present invention. For this operation 300, the wireless communication device 101 may operate for activating an event but, initially, detecting a vertical orientation of the wireless communication device, at step 301. For one embodiment, the wireless communication device 101 may detect that it is positioned at vertical orientation by determining that the device is positioned perpendicular to a horizontal orientation, in which the horizontal orientation associated with the wireless communication device when at rest on a horizontal surface. For another embodiment, the wireless communication device 101 may detect that it is at a vertical orientation by determining a base surface, i.e., back surface 121, has a vertical orientation, in which the base surface has a surface area greater than at least one other external surface, i.e., top, bottom, left or right surface 113, 115, 117, 119, of the housing. As noted above, a vertical orientation, as defined by this disclosure, references a substantially vertical orientation, which is more vertical in orientation than horizontal. The vertical orientation may vary by 45 degrees in either direction (for a full range of 90 degrees) from an absolute vertical orientation relative to the ground.

After detecting the vertical orientation of the wireless communication device 101, the operation 300 may then detect a rotational movement, linear movement or gesture-based movement of the wireless communication device 101, at step 303. The linear movement may be unidirectional or bidirectional (i.e., back and forth motion). This step of detecting movement at step 303 may occur subsequent to, or in response to, the step 301 of detecting vertical orientation. For one embodiment, the operation 300 may detect rotational movement about a center 129 of the wireless communication device 101. For another embodiment, the operation 300 may detect linear movement of the wireless communication device 101 in which two or more portion of the device move in parallel. The movement may be detected in one or two dimensions and parallel to a vertical plane, such as vertical plane 105 or vertical surface 125.

In response to detecting the vertical orientation and movement of the wireless communication device 101, the operation 300 may then perform a function of the device, at step 305. For one embodiment, the operation 300 may coordinate the function with a remote device, such as an electronic circuit or device 131, via a wireless link 133. For another embodiment, the operation 300 may perform a function associated with an application currently executed by a processor 203, or currently stored in memory 205, of the wireless communication device 101. For yet another embodiment, the operation 300 may perform a first function in response to a first movement of the device 101 (such as rotating the device clockwise) and perform a second function different from the first function in response to a second movement different from the first movement (such as rotating the device counter-clockwise).

In addition to the above steps, the operation 300 may execute other steps to enhance the operation of the wireless communication device 101 in accordance with the present invention. For one embodiment, the operation 300 may determine that the wireless communication device 101 is motionless for a threshold time period, at step 307, and, when detecting a movement of the wireless communication device 101 at step 303, the movement of the device may be detected in response to determining that the wireless communication device is motionless for the threshold time period. This step 307 of determining that the device 101 is motionless may occur before the step of detecting movement 303, and the operation 300 performs the step 303 of detecting movement in response to determining that the device is motionless. The threshold time period should be long enough to minimize an inadvertent activation of the function due to normal usage of the wireless communication device 101, i.e., when the user did not intend to activate the function. The threshold time period should be short enough to minimize any difficulty by the user in fulfilling this motionless time period, i.e., when the user intends to activate the function. Also, as stated above, a vertical plane 105 may be utilized to facilitate the fulfillment of remaining motionless for the threshold time period by positioning the wireless communication device 101 adjacent to or against the vertical surface 125 of the vertical plane 105.

For another embodiment, the operation 300 may position the back surface 121 of the housing of the wireless communication device 101 is positioned adjacent to the vertical surface 125 of the vertical plane 105, at step 309. This step 309 of determining that the device 101 is adjacent to the vertical plane 105 or vertical surface 125 may occur before the step 303 of detecting movement, and the step of detecting movement may occur in response to determining that the device is adjacent to the vertical plane 105 or vertical surface 125.

For yet another embodiment, the operation 300 registers the wireless communication device at step 311. This step 311 of registering with a cellular communication network via a cellular transceiver 211, or detecting that a cellular transceiver, may occur at any time during this operation 300. For still another embodiment, the operation 300 initiates a wireless link, such as wireless link 133, via an ad hoc communication protocol with a remote device, such as the electronic circuit or device 131. It should be noted that, as described above, the components 200 of the embodiments may include one or more wireless transceivers 201 providing the capability of communication via cellular communication protocol and ad hoc communication protocol. Thus, a cellular communication link to a base station may exist before the step 313 of initiating the wireless link to the remote device, and the cellular communication link and the wireless link 133 may co-exist with each other.

It should further be noted that the step 133 of initiating a wireless link to the remote device may occur any time during the operation 300. This wireless link initiation may need to occur before the step 305 of performing the device function, if the device function requires communication with the remote device. Also, this wireless link initiation may occur in response to the step 301 of detecting vertical orientation, step 303 of detecting movement, step 307 of determining that the device is motionless, or step 309 of determining that the device is adjacent to the vertical plane 105 or the vertical surface 125. In doing so, the operation 300 may minimize unnecessary power consumption of the power supply 223 by the wireless transceiver, such as WLAN transceiver 213, by waiting for a need for the wireless link before initiating it.

The user may move the wireless communication device 101 any way and anywhere subsequent to detecting a substantially vertical orientation and a movement of the device. Once the vertical orientation and movement are detected, the need to maintain the device at a particular position or orientation decreases. This freedom of movement may facilitate user input, if desired, after the vertical orientation and movement are detected, such to facilitate entry of a personal identification number or password. Of course, if the operation 300 includes the step of initiating a wireless link to a remote device (i.e., step 133), then it may be preferable to maintain the device at a stationary position until the wireless link is established.

For a further embodiment, the operation 300 may determine what application or applications are currently executed by a processor 203, or currently stored in memory 205, and determine whether the active application(s) are associated with the function to be performed, at step 315. By executing this step 315 of determining whether application(s) are associated with the function, the operation 300 may determine which function to perform at step 305. For example, the operation 300 may only perform a device function associated with an active application. By executing this step 315, the operation 300 may also determine how to perform the device function at step 305. For example, the operation 300 may transfer messages to the remote device 131 via the wireless link 133 if the active application is a mail application, whereas the operation may transfer files to the remote device if a browsing or imaging application is currently active at the device 101.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of a wireless communication device for activating an event, the wireless communication device including at least one first sensor, at least one second sensor, and a processor, the method comprising:
   detecting, by the at least one first sensor, a substantially vertical orientation of the wireless communication device, wherein the substantially vertical orientation is more vertical than horizontal in orientation relative to ground;
   detecting, by the at least one second sensor, a proximity of the wireless communication device to a substantially vertical surface, wherein the at least one second sensor is different from the at least one first sensor, and wherein the substantially vertical surface is more vertical than horizontal relative to ground;
   determining, by the processor and based on the detecting by the at least one second sensor, that the wireless communication device is positioned adjacent to the substantially vertical surface;
   after determining that the wireless communication device is positioned adjacent to the substantially vertical surface, determining, by the processor, that the wireless communication device is motionless for a threshold time period;
   responsive to the processor determining that the wireless communication device is motionless for the threshold time period, detecting, by the at least one first sensor, a rotational or sliding movement of the wireless communication device against the substantially vertical surface after detecting the substantially vertical orientation of the wireless communication device;
   determining, by the processor, a function of the wireless communication device based on the at least one first sensor detecting the substantially vertical orientation of the wireless communication device, the at least one second sensor detecting the proximity of the wireless communication device to the substantially vertical surface, and the at least one first sensor detecting the rotational or sliding movement of the wireless communication device against the substantially vertical surface; and
   performing, by the processor, the function of the wireless communication device.

2. The method of claim 1, wherein detecting the rotational or sliding movement of the wireless communication device includes one of detecting the rotational movement about a center of the wireless communication device, detecting linear movement of the wireless communication device, or detecting gesture-based movement of the wireless communication device.

3. The method of claim 1, wherein detecting the rotational or sliding movement of the wireless communication device includes detecting the rotational or sliding movement in no more than two dimensions and parallel to a substantially vertical plane.

4. The method of claim 1, further comprising registering the wireless communication device with a cellular communication network prior to detecting the substantially vertical orientation of the wireless communication device.

5. The method of claim 1, further comprising initiating a wireless link via an ad hoc communication protocol with a remote device.

6. The method of claim 1, wherein performing the function of the wireless communication device includes coordinating the function with a remote device via a wireless link.

7. The method of claim 1, wherein performing the function of the wireless communication device includes performing a particular function that is associated with an application currently being executed by the wireless communication device.

8. A wireless communication device comprising:
   a processor;
   a housing;

a first wireless transceiver supported by the housing, the first wireless transceiver capable of communicating with a first network;

a second wireless transceiver supported by the housing, the second wireless transceiver capable of communicating with a remote device via a second network different from the first network;

a first sensor supported by the housing, the first sensor detecting a substantially vertical orientation of the wireless communication device and a rotational or sliding movement of the wireless communication device subsequent to detecting the substantially vertical orientation of the wireless communication device, wherein the substantially vertical orientation is more vertical than horizontal in orientation relative to ground; and a second sensor different from the first sensor, the second sensor detecting a proximity of the wireless communication device to a substantially vertical surface, the substantially vertical surface being more vertical than horizontal relative to ground, wherein the processor determines, based on the detecting by the second sensor, that the wireless communication device is positioned adjacent to the substantially vertical surface, wherein after determining that the wireless communication device is positioned adjacent to the substantially vertical surface, the processor determines that the wireless communication device is motionless for a threshold time period, wherein the first sensor detects the rotational or sliding movement of the wireless communication device against the substantially vertical surface responsive to the processor determining that the wireless communication device is motionless for the threshold time period, wherein the processor determines a function of the wireless communication device based on the first sensor detecting the substantially vertical orientation of the wireless communication device, the second sensor detecting the proximity of the wireless communication device to the substantially vertical surface, and the first sensor detecting the rotational or sliding movement of the wireless communication device against the substantially vertical surface, and wherein the processor performs the function of the wireless communication device in coordination with the remote device via the second wireless transceiver.

9. The wireless communication device of claim 8, wherein the wireless communication device is not self-supported at the substantially vertical orientation and requires an external support be positioned at the substantially vertical orientation.

10. The wireless communication device of claim 8, wherein:
the wireless communication device is positioned at a horizontal orientation when the wireless communication device rests on a horizontal surface; and
the wireless communication device is positioned perpendicular to the horizontal orientation when the wireless communication device is positioned at the substantially vertical orientation.

11. The wireless communication device of claim 8, wherein:
the housing includes a base surface having a surface area greater than at least one other external surface of the housing; and
the first sensor detects the substantially vertical orientation of the wireless communication device by determining that the base surface has the substantially vertical orientation.

12. The wireless communication device of claim 8, wherein the first sensor detects the rotational or sliding movement of the wireless communication device by detecting either the rotational movement about a center of the wireless communication device or a linear movement of the wireless communication device.

13. The wireless communication device of claim 8, wherein the first sensor detects the rotational or sliding movement of the wireless communication device by detecting the rotational or sliding movement in no more than two dimensions and parallel to a substantially vertical plane.

14. The wireless communication device of claim 8, wherein the processor performs the function of the wireless communication device associated with an application currently being executed by the wireless communication device.

* * * * *